United States Patent
Chiang et al.

(10) Patent No.: US 7,528,177 B2
(45) Date of Patent: May 5, 2009

(54) PREPARATION METHOD FOR NANOMETER GRADE ZINC OXIDE CRYSTALLINE (ZINCITE) SOL

(75) Inventors: Anthony Shiaw-Tseh Chiang, Tao-Yuan Hsien (TW); Chih-Tsung Hsu, Taipei Hsien (TW); Ching-Ping Yang, Tao-Yuan Hsien (TW)

(73) Assignee: Headway Advanced Materials Co., Ltd, Hsinchu (TW)

( * ) Notice: Subject to any disclaimer, the term of this patent is extended or adjusted under 35 U.S.C. 154(b) by 678 days.

(21) Appl. No.: 11/237,792

(22) Filed: Sep. 29, 2005

(65) Prior Publication Data

US 2006/0222586 A1  Oct. 5, 2006

(30) Foreign Application Priority Data

Mar. 29, 2005  (TW) .............. 94109891 A

(51) Int. Cl.
*B01F 3/12* (2006.01)
*C09D 17/00* (2006.01)
*C09C 1/04* (2006.01)

(52) U.S. Cl. .............. 516/33; 516/88; 516/98; 106/425; 106/286.6

(58) Field of Classification Search ............ 516/33, 516/88, 98; 423/101, 102, 104, 622; 106/425, 106/286.1, 286.6
See application file for complete search history.

(56) References Cited

U.S. PATENT DOCUMENTS 5,391,354 A  2/1995  Petersen et al.
6,200,680 B1 *  3/2001  Takeda et al. ............... 428/402
6,710,091 B1  3/2004  Womelsdorf et al.

OTHER PUBLICATIONS

Detlef W. Bahnemann et. al.; *Preparation and Characterization of Quantum Size Zinc Oxide: A Detailed Spectroscopic Study*; 1991; J. Phys. Chem; pp. 3789-3798.

Daisuke Kaneko et. al.; *Synthesis of ZnO Particles by Ammonia-Catalyzed Hydrolysis of Zinc Dibutoxide in Nonionic Reversed Micelles*; 2000; Langmuir; pp. 4086-4089.

Dairong Chen et. al.; *Hydrothermal sysnthesis of zinc oxide powders with different morphologies*; 2000; Solid State Communications; pp. 363-366.

Markus Haase et. al.; *Photochemistry and Radiation Chemistry of Colliodal Semiconductors. 23. Electron Storage on ZnO Particles and Size Quantization*; 1988; J. Phys. Chem.; pp. 482-487.

Lubomir Spanhel et. al.; *Semiconductor Clusters in the Sol-Gel Process: Quantized Aggregation, Gelation, and Crystal Growth in Concentrated ZnO Colloids*; 1991; J. Am. Chem. So.; pp. 2826-2833.

Claus Feldmann; *Polyol-Mediated Synthesis of Nanoscale Functional Materials*; 2003; Adv. Func. Mater.; pp. 101-107.

* cited by examiner

*Primary Examiner*—Daniel S Metzmaier
(74) *Attorney, Agent, or Firm*—Bacon & Thomas, PLLC

(57) ABSTRACT

An environmentally friendly method for preparing zinc oxide (zincite) nanoparticle sol having more than 90% visible light transmission at 20 wt % solid; comprises of the neutralizing, under specific pH, an inorganic zinc salt with an inorganic alkali, both dissolved in ethylene glycol, and thermally aging the precipitates afterward.

5 Claims, 2 Drawing Sheets

PREPARATION METHOD FOR NANOMETER GRADE ZINC OXIDE CRYSTALLINE (ZINCITE) SOL

BACKGROUND OF THE INVENTION

The present invention relates to the preparation of zinc oxide (zincite) nanoparticle sol, particularly to the use of wet chemical process to prepare zinc oxide (zincite) nanoparticle sol having high concentration and high visible light transmittance, wherein the process uses only inorganic reactants and high boiling solvent so that volatile organic vapor or organic waste are avoid.

Zinc oxide (zincite, ZnO) is an odorless solid of hexagonal crystal structure, which can be used as white pigment, catalyst, antibacterial skin-protection ointment, sunscreen ointment, rubber vulcanization accelerator and ultraviolet absorber for woodwork vanishes.

The term "nanoparticle" refers to particles having a diameter smaller than 100 nm. Particles, particle aggregates or particle agglomerates of zinc oxide that are larger than about 30 nm lead to light scattering and thus become non-transparent in the visible light range. On the other hand, nanoparticles smaller than about 30 nm is transparent in visible light range, and are potentially suitable for use as UV absorbers in transparent organic-inorganic hybrid materials, transparent plastics, paints, coatings and for the protection of UV-sensitive organic pigments.

When zinc oxide is in nanoparticle form, its high specific surface area as well as the quantum size effect may further alter its magnetism, light, electric properties and increases its catalytic activity, thus offers possible applications in infrared, ultra violet ray resistance, sun-proof cosmetics, antibacterial and malodor resistance, photocatalyst and self-cleaning glass etc. Even in the rubber vulcanization accelerator application, a reduced formulation may be possible if nanocrystals of zinc oxide is used instead of the conventional zinc oxide particles.

PRIOR ART

The manufacturing of zinc oxide can be broadly divided into gas phase process and wet chemical process. Gas phase process typically involves calcination at high temperature, and thus results in large particles. Finely divided zinc oxide is prepared predominantly by wet chemical processes. Precipitation in aqueous solution generally gives hydroxide and/or carbonate-containing materials that have to be thermally converted to zinc oxide. The thermal post-treatment again leads to the formation of undesirable micrometer-sized aggregates.

The zinc sources commonly used in the wet chemical process are zinc chloride, zinc alkoxide, zinc acetate, zinc carbonate, zinc oxalate. Chen et al. (Solid state communication, 2000, 113, 363-366) discloses a process that use aqueous zinc chloride ($ZnCl_2$) as precursor and neutralized with sodium hydroxide to form white precipitates. After washed with deionized water, the pH value of the filtered precipitates was adjusting with hydrochloric acid, and hydrothermal reacted at 100 deg C to 220 deg C with ethylene glycol or cyclohexamethylene tetramine as protection agent. It is claimed that zinc oxide particles with size of 20~100 nm could be obtained. Similar aqueous process appeared in JP-A-04 164 814 where the precipitation was made in aqueous medium at elevated temperature to obtain finely divided ZnO. The average particle size is given as 20-50 nm, with no information on the degree of agglomeration. In both the above cases, a high reaction temperature is used and >20 nm agglomerate is produced, which may lead to light scattering undesirable in transparent applications.

U.S. Pat. No. 5,391,354 describes the preparation of ZnO nanoparticles from expensive zinc alkoxide. Kaneko et al. (Langmuir, 2000, 16, 4086-4089) also use zinc alkoxide in a reverse micelle process to produce ZnO nanocrystals. The process involves the hydrolysis of zinc butyl-alkoxide in a cyclopentane solution containing polyoxyethylene(6)nonylphenyl ether(NP-6) surfactant and aqueous ammonia. Zinc oxide (zincite) nanocrystals of about 10~20 nanometer can be obtained without heating. However, these processes are uneconomical due to the expensive starting material.

JP-A-07 232 919 describes the preparation of ZnO particles in the 5-10,000 nm size range from zinc compounds by reaction with organic acids and other organic compounds such as alcohols at elevated temperature. The hydrolysis is carried out such that the by-products that form (esters of the acids used) can be distilled off. The process permits the preparation of ZnO powders that are redispersible because of the surface modification carried out beforehand. However, based on the examples given in this application the smallest average primary particle diameter is given as 15 nm.

There have also been many efforts to obtain ZnO by the hydrolysis of zinc acetate in alcohol solvent. Bahnrmann et al. (J. Phys. Chem., 1987, 91, 3789-3798) dissolves 1 mmol zinc acetate into about 1000 mL isoprapanol($(CH_3)_2CHOH$) at 50 deg C, then neutralize it with sodium hydroxide/isoprapanol solution to obtain a sol of about 0.001 mole/L in zinc concentration, heating the sol at 65 deg C for 2 hours, continued by aging at room temperature for 3 days, vacuum heating at 30 deg C to a final transparent sol of 5 µm zinc oxide nanocrystals in isopropanol or water. A similar procedure was also used by Henglein et al. (J. Phys. Chem. 1988, 92, 482-487) and concluded that it is not possible to obtain a stable sol with more than 0.01 wt % ZnO. Spanhel et al. (JACS, 1991, 113, No.8, 2826-2833) later found that a more concentrated sol (~1.0 wt %) in alcohol can only be obtained if expensive alkali, such as LiOH or tetramethylammonium hydroxide, were used.

To solve the above-mentioned difficulties, Womelsdorf et al. (U.S. Pat. No. 6,710,091) disclosed an invention that dissolves zinc acetate in alcohol or alcohol-water mixture solution and neutralizes it with alkali to form a whitish precipitate. When zinc oxide is no longer in colloidal disperse form, the supernatant is exchanged for fresh solvent and the precipitate is thickened to give a gel and separated from the supernatant phase. The resulting zinc oxide gel can be redispersed, with optional surface-modifying compounds, in organic solvents and/or water, in particular polar aprotic solvents such as dichloromethane and/or chloroform or diol and/or polyol/water mixtures, to give a transparent sol with largely <15 nm primary particles.

Feldmann (Adv. Func. Mater. 2003, 13, 101-107) described a process that produces $ZnO:In^{3+}$ nanoparticles by high temperature decomposition of acetates in diethylene glycol. They dissolved 10 g zinc acetate hydrate and 0.66 g indium acetate in 100 mL diethylene glycol under 80 deg C, adding 2 mL water under strong stirring, and heating rapidly to 180 deg C and hold at the temperature for 2 hours to obtain a bluish sol of $ZnO:IN^{3+}$ spherical particles about 90 nm in size. The requirement of high temperature reaction, as well as the use of expensive alkoxide, is undesirable, and the particle size is larger than the current invention.

SUMMARY OF THE INVENTION

The invention of Womelsdorf is an important advance of the art for producing ZnO nanoparticle sol, since it is able to use less expensive sodium hydroxide, potassium hydroxide or amine as alkali and the hydrolysis occurs at a higher Zn concentration (~10 wt % ZnO) that consumes lesser alcohol solvent. However, as disclosed in claim 3 of this patent, at least part of the zinc source must be zinc acetate or its hydrate. They further specified that "The alcohol used is preferably a monoalcohol, very particularly preferably methanol", as it is clear from cited researches that concentrated zinc oxide nanoparticle sol can not be produced by the hydrolysis of zinc acetate with sodium hydroxide or potassium hydroxide in an ethanolic solution.

Zinc acetate is not a pleasant chemical to work with because of its malodor, and the difficult of disposing the acetate byproduct after alkali neutralization. Methanol is also a less preferred solvent in industry because of its high volatility and toxicity. A green process that does not produce organic waste and volatile organic emission would be much more attractive.

The object of the present invention is therefore to provide an environmental friendly method for the production of zinc oxide nanoparticle, which combines strong UV-absorption even in the UV-A region with excellent dispersion properties for minimal scattering. By environmental friendly, we refer to process that employs only non-volatile and non-toxic solvent with inexpensive inorganic zinc salts and alkali that minimize the production of organic byproduct. To reduce visible light scattering so that the ZnO nanoparticle sol is transparent, the zinc oxide nanoparticles of this invention have size smaller than 15 nm.

Starting from the example demonstrated in Womelsdorf's patent, where they dispersed the ZnO gel produce by the hydrolysis of zinc acetate in methanol to a water/ethylene glycol mixture, it was surprisingly found that one can directly produce ZnO nanoparticles in ethylene glycol without going through the troublesome process they have invented.

Ethylene glycol, with a normal boiling point of 198 deg C, is a non-volatile and non-toxic solvent that is used as raw material in manufacturing polyester and as additive in cosmetic products. It has two hydroxyl groups that can act as chelating agent for zinc ion or as surface modifier for ZnO nanoparticles to prevent their growth and agglomeration. It is surprisingly found that inorganic zinc salt such as zinc chloride dissolved in ethylene glycol where as organic salt such as zinc acetate does no. Consequently, one can employ the less expensive and environmental friendly inorganic zinc salt as the starting material to reach the desired goal.

The process according to the invention is preferably carried out with an ethylene glycol solution where an inorganic zinc salt is completely dissolved and hydrolyzed by adding an ethylene glycol solution of mineral alkali at a temperatures between the freezing and boiling point of ethylene glycol. This produces a whitish precipitate. The precipitate can be optionally thickened by settling and leaving to stand, by filtration or by centrifuging and removing part of the supernatant. The thickened precipitate is then heated at 40~100 deg C for 1 to 6 hours, and directly converted to a highly transparent sol of ZnO (zincite) nanoparticles dispersed in ethylene glycol.

The hydrolysis of zinc salt is preferably carried out at a pH value higher than 8 and lower than 11 using close to stoichiometric amounts of alkali. It is further preferred to limit the amount of water content in the solution to less than 10 times the molar amount of zinc. The water content in the solution could result from the hydration water of the inorganic salts or as the impurity of the ethylene glycol raw material employed.

In a preferred embodiment of the invention, the ZnO nanoparticles produced is smaller than 15 nm by DLS (ZetaSizer-3000, Malvern) measurement. A drop of the diluted sol on carbon coated copper grid is prepared for TEM analysis, which showed the primary particles are of 4~6 nm size and ellipsoidal in shape. The largest aggregation is smaller than 10 nm, which is consistent with the result of DLS analysis. The powder XRD obtained from dried sample of the sol confirms that the particles are zincite. The crystal domain size estimated from the full width at half height (FWHH) of the strongest peak by Scherrer equation is 5~6 nm, consistent with the TEM observation. Dried powder extracted from the sol can be re-dispersed in water/ethylene glycol solution to form a transparent sol again.

DETAILED DESCRIPTION OF THE PREFERRED EMBODIMENTS

The invention is described in more detail with reference to the examples below without being limited to these examples.

EXAMPLE 1

136 g of zinc chloride dehydrate is added to 450 mL of ethylene glycol, stir about 20~30 minutes under 60 deg C to prepare 500 mL of 2M inorganic zinc acidic solution. At the same time, 80 g of sodium hydroxide is added to 960 mL of water containing ethylene glycol to prepare a 2M alkaline solution. The acidic solution and the alkaline solution are fed to a reactor containing 1200 mL of ethylene glycol at a constant rate, while controlling the hydrolysis to occur at pH 9.0. Whitish precipitate is produced during hydrolysis. The final content in the reactor is heated at 80 deg C for 2 hours, and converted to a transparent zinc oxide (zincite) nanoparticle sol. The zinc oxide content in this sol is about 2.5 wt %. X-ray diffraction pattern of a dried sample shows zincite hexagonal crystalline structure. The crystalline domain size estimated by Scherrer equation is 5.4 nm. When the sol is diluted 20 times and subjected to UVVIS spectroscopic measurement, the absorption edge occurs at 365.3 nm, which corresponds to nanocrystal size of 5.2 nm.

EXAMPLE 2

Figure 1:
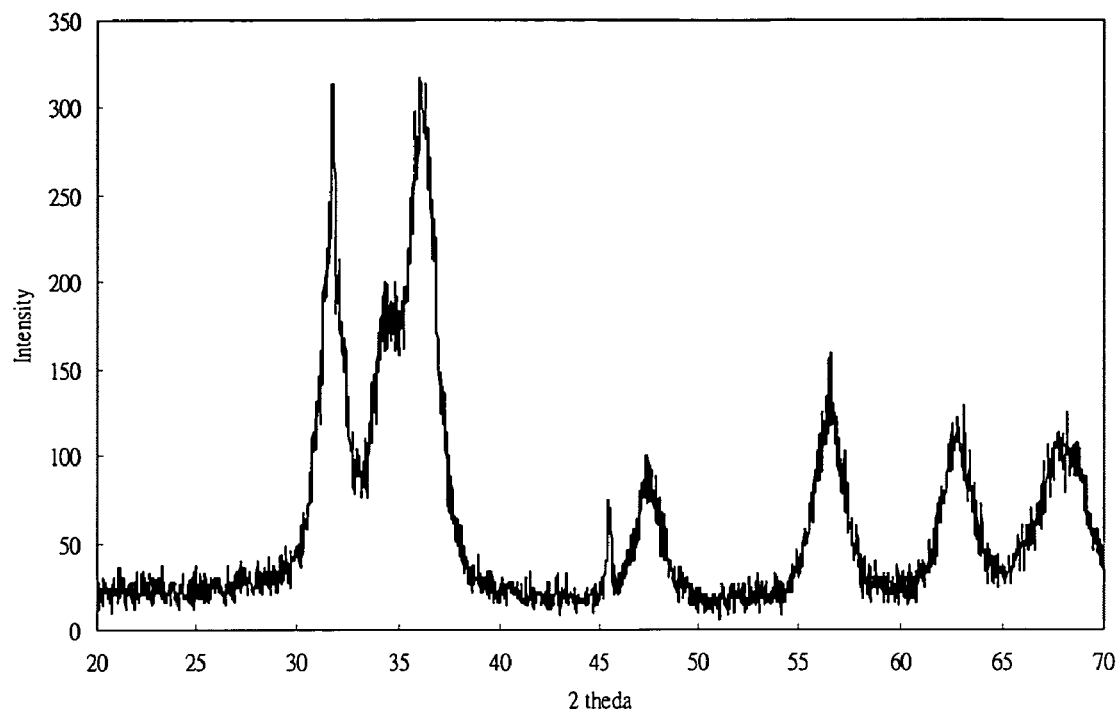
FIG. 1 The UV/VIS transmission spectrum of the concentrated (20 wt % ZnO) and transparent sol obtained from Example 2.
Figure 2:
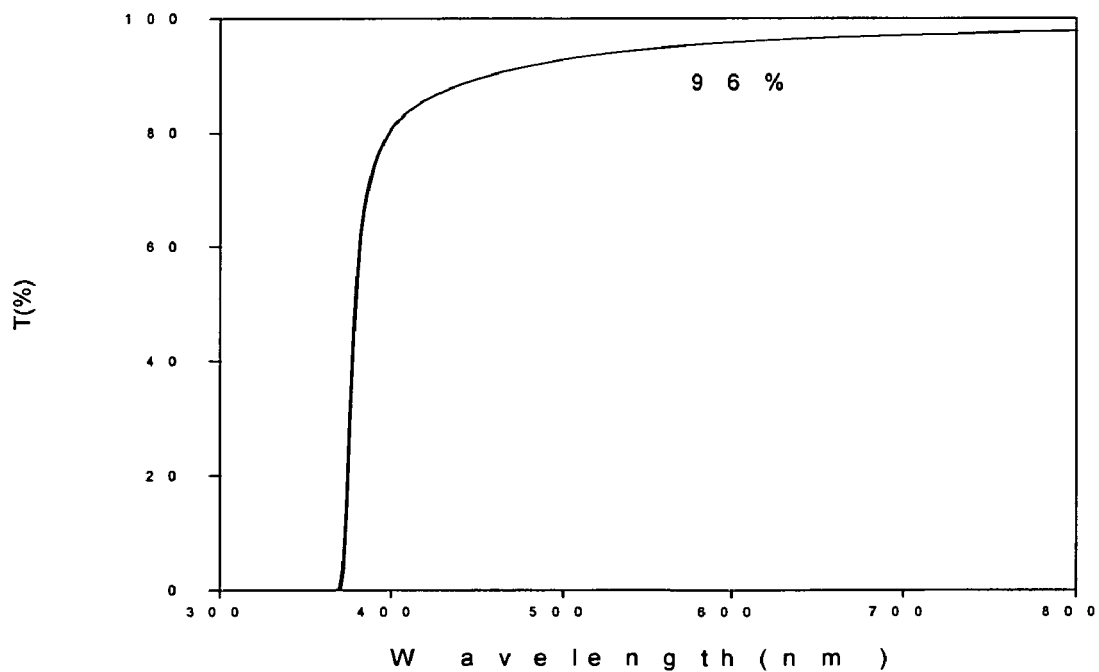
FIG. 2 X-ray diffraction pattern of dried sample obtained from the concentrated zinc oxide nanoparticle sQl described in Example 2.
Figure 3:
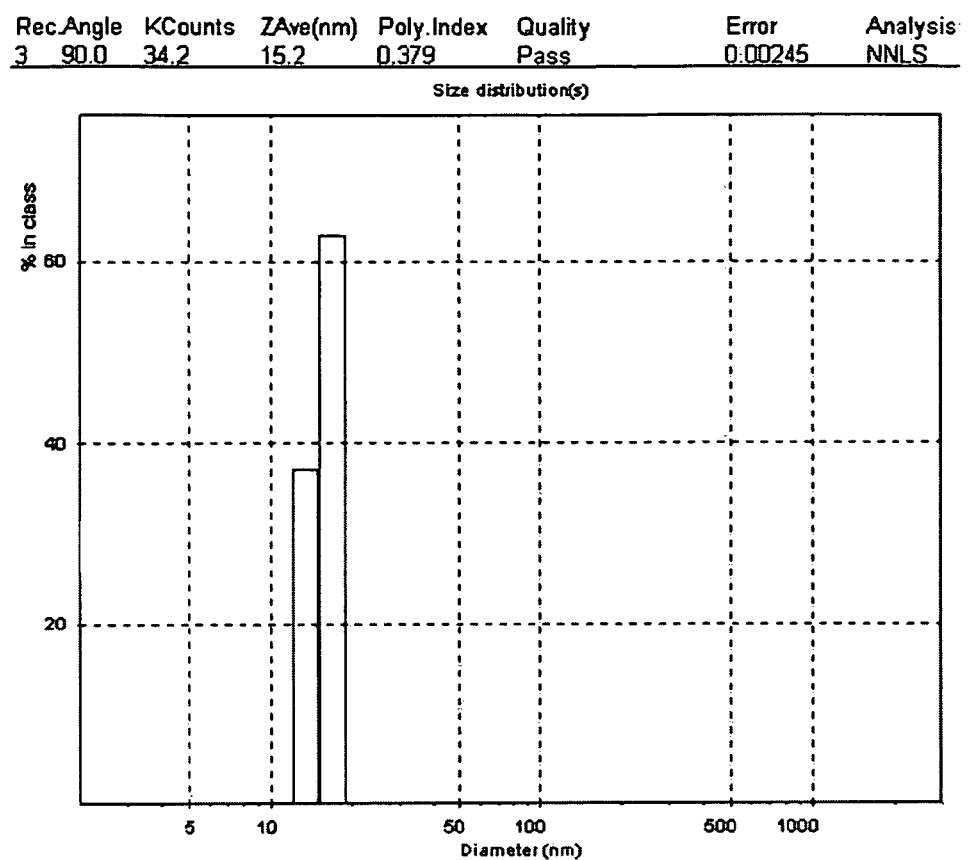
FIG. 3 The particle size distribution of the 200 times diluted sol obtained from Example 2 by DLS (Dynamic Light Scattering).
Figure 4:
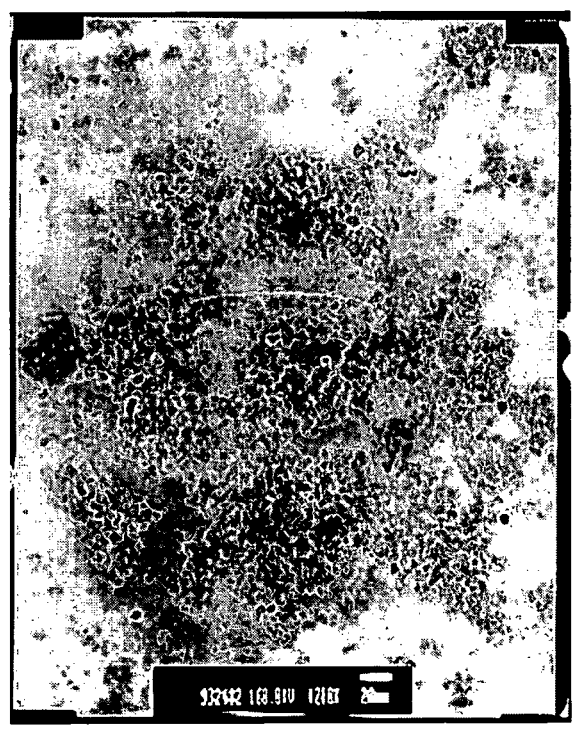
FIG. 4 TEM microgram of the ZnO nanoparticles obtained from Example 2.

The procedures described in the Example 1 are repeated to prepare an ethylene glycol solution with whitish precipitate. The precipitate is thickened by filter out the excess supernatant until 407 g of white slurry is obtained. The slurry is heated at 80 deg C for 2 hours, and converted to a transparent sol of concentrated sol of zinc oxide nanoparticles. The zinc oxide content in this concentrated sol is about 20 wt %. Even at this concentration, the sol is still transparent to visible light and has a transmission greater than 90% at 600 nm as showed in FIG. 1. X-ray diffraction pattern of a dried sample shows zincite hexagon crystalline structure in FIG. 2. The crystalline domain size is about 5.7 nm by Scherrer equation estimated from the half-width of the major peak. The particle size distribution obtained by DLS (Dynamic Light Scattering) on a 200 time diluted sample is shown in FIG. 3. The TEM micrograph is shown in FIG. 4, which clearly indicates the particle size is smaller than 15 nm. Zincite contained in the sol is confirmed by X-ray diffraction analysis. The crystalline size is about 5~6 nm by estimating the half-width of peak in the X-ray diffraction pattern, and the average particle size is about 15 nm by estimating the dynamic scattering particle size analysis.

What claimed is:

1. A preparing method for nanometer grade zinc oxide crystalline (zincite) sol, having more than 90% visible light transmission at 20 wt % and $\leqq 15$ nm average particle size, comprises of:

a.) Neutralizing under pH 8~11 an ethylene glycol solution of inorganic zinc salt with an ethylene glycol solution of inorganic alkali;

b.) Optionally thicken the precipitate by settling or filtering and removing of excess supernatant until reaching a zinc concentration to 0.3~3 mole/liter;

c.) Ageing the thickened precipitate at 40~100 deg C for 1~6 hours until turns into transparent sol.

2. A preparation method as defined in claim 1, wherein said inorganic zinc salt is selected from one or more than one of the group of zinc chloride and zinc chloride hydrate.

3. A preparation method as defined in claim 1, wherein said inorganic alkali is selected from one or more than one of the group of sodium hydroxide, potassium hydroxide and ammonia.

4. A preparation method as defined in claim 1, wherein said ethylene glycol solution of zinc salt further contains 0.01~0.3 mol % of other cation.

5. A preparation method as defined in claim 1, wherein said ethylene glycol solutions further contains water at 2~6 times the mole of alkali and less than 0.1% of organic base.

\* \* \* \* \*